(12) United States Patent
Wang

(10) Patent No.: US 9,280,226 B2
(45) Date of Patent: Mar. 8, 2016

(54) INFORMATION PROCESSING METHOD FOR SWITCHING OPERATION STATE BASED ON SIZE OF CONTACT PORTION AND ELECTRONIC APPARATUS

(71) Applicants: Beijing Lenovo Software Ltd., Beijing (CN); Lenovo (Beijing) Co., Ltd., Beijing (CN)

(72) Inventor: Yongliang Wang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 18 days.

(21) Appl. No.: 14/230,089

(22) Filed: Mar. 31, 2014

(65) Prior Publication Data

US 2015/0042576 A1 Feb. 12, 2015

(30) Foreign Application Priority Data

Aug. 8, 2013 (CN) .......................... 2013 1 0344502

(51) Int. Cl.
*G06F 3/041* (2006.01)
*G06F 3/0488* (2013.01)

(52) U.S. Cl.
CPC .............. *G06F 3/041* (2013.01); *G06F 3/0416* (2013.01); *G06F 3/0488* (2013.01); *G06F 2203/04104* (2013.01)

(58) Field of Classification Search
CPC ............ G06F 2203/04104; G06F 3/041–3/047
USPC ..................................... 345/173–178
See application file for complete search history.

(56) References Cited

U.S. PATENT DOCUMENTS

| 8,577,644 | B1 * | 11/2013 | Ksondzyk | ............. | G06F 3/0414 345/173 |
| 2004/0207606 | A1 * | 10/2004 | Atwood | .................. | G06F 3/045 345/173 |
| 2006/0105801 | A1 * | 5/2006 | Cho | .................... | H04M 1/0245 455/550.1 |
| 2011/0215914 | A1 * | 9/2011 | Edwards | ..................... | 340/407.2 |
| 2013/0271400 | A1 * | 10/2013 | Yao et al. | ....................... | 345/173 |

* cited by examiner

*Primary Examiner* — Larry Sternbane
(74) *Attorney, Agent, or Firm* — Harness, Dickey & Pierce, P.L.C.

(57) ABSTRACT

An information processing method and an electronic apparatus are provided. The method is applied to an electronic apparatus including a touch unit. The method includes: if it is sensed that a first touch operation is performed on a surface of the touch unit by a first touch object, detecting a first contact area of a portion where the touch unit contacts with the first touch object; judging whether the first contact area satisfies a first preset condition; and in the case that the first contact area satisfies the first preset condition, controlling the electronic apparatus to switch from a first operating state to a second operating state and generate first prompt information for prompting that the electronic apparatus operates in the second operating state.

10 Claims, 3 Drawing Sheets

INFORMATION PROCESSING METHOD FOR SWITCHING OPERATION STATE BASED ON SIZE OF CONTACT PORTION AND ELECTRONIC APPARATUS

CROSS REFERENCES OF RELATED APPLICATION

The present application claims the priority to Chinese Patent Application No. 201310344502.1, entitled "INFORMATION PROCESSING METHOD AND ELECTRONIC APPARATUS", filed on Aug. 8, 2013 with the State Intellectual Property Office of People's Republic of China, which is incorporated herein by reference in its entirety.

FIELD

The disclosure relates to electronic technologies, and in particular, to an information processing method and an electronic apparatus.

BACKGROUND

Thanks to the progresses in science and technologies, rapid developments take place in electronic technologies. There exists a great variety of electronic products, and accordingly, people benefit from the convenience due to the progresses in science and technologies. Usually, an electronic apparatus may include various input devices, for example, mouse, keyboard, touch unit, etc. The touch unit is convenient to operate, and consequently, is appreciated by an increasing number of users.

Conventionally, the electronic apparatus may switch among different operating states based on different touch operations received by the touch unit.

Before the implementation of a technical solution of the disclosure, the inventor of the disclosure finds at least the following disadvantages.

Conventionally, since no information is given for prompting that the operating state of the touch unit is switched, the touch unit may respond wrongly.

For example, the electronic apparatus is in a first operating state at a first moment. In the first operating state, the touch unit responds to a touch operation by responding to touch coordinates. While the electronic apparatus is in a second operating state at a second moment. In the second operating state, the touch unit responds to the touch operation by responding to a touch area. However, a user utilizing the electronic apparatus is not informed that the operating state of the electronic apparatus has been switched, and the user performs the touch operation with a concept that the electronic apparatus still responds to the touch coordinates. Therefore, the touch unit generates a wrong response.

SUMMARY

An information processing method and an electronic apparatus are provided according to embodiments of the disclosure, to solve an exiting problem that a touch unit responds wrongly.

In one aspect, an information processing method is provided according to an embodiment of the disclosure.

The information processing method, applied to an electronic apparatus including a touch unit, includes:

if it is sensed that a first touch operation is performed on a surface of the touch unit by a first touch object, detecting a first contact area of a portion where the touch unit contacts with the first touch object;

judging whether the first contact area satisfies a first preset condition; and controlling the electronic apparatus to switch from a first operating state to a second operating state and generate first prompt information for prompting that the electronic apparatus operates in the second operating state, in the case that the first contact area satisfies the first preset condition.

Optionally, the process of judging whether the first contact area satisfies the first preset condition includes:

judging whether the first contact area is larger than a first preset area threshold, and determining that the first contact area satisfies the first preset condition if the first contact area is larger than the first preset area threshold; or judging whether the first contact area is smaller than a first preset area threshold, and determining that the first contact area satisfies the first preset condition if the first contact area is smaller than the first preset area threshold.

Optionally, before judging whether the first contact area is larger than the first preset area threshold or before judging whether the first contact area is smaller than the first preset area threshold, the method further includes:

determining a second contact area of a portion where the touch unit contacts with a first user;

obtaining a second preset area threshold pre-stored in the electronic apparatus; and determining the first preset area threshold corresponding to the first user, based on the second contact area and the second preset area threshold.

Optionally, in the case that the first operating state is a state in which the touch unit responds to the touch operation in a first responding mode, the process of controlling the electronic apparatus to switch from the first operating state to the second operating state includes:

controlling a responding mode of the touch unit to switch from the first responding mode to a second responding mode different from the first responding mode, and determining that the electronic apparatus operates in the second operating state in the case that the responding mode is the second responding mode.

Optionally, after controlling the responding mode of the touch unit to switch from the first responding mode to the second responding mode different from the first responding mode, the method further includes:

determining an instruction set corresponding to the second responding mode;

determining, from the instruction set, a first control instruction corresponding to the first touch operation, in response to the first touch operation to; and executing the first control instruction to implement a first function corresponding to the first control instruction.

Optionally, the process of controlling the electronic apparatus to switch from the first operating state to the second operating state includes:

controlling the electronic apparatus to display an interactive object on a surface of a display unit of the electronic apparatus, and determining that the electronic apparatus is in the second operating state in the case that the interactive object is displayed on the surface of the display unit.

Optionally, the first prompt information is revealed by:

displaying a first preset image on the surface of the display unit of the electronic apparatus; or performing touch feedback on the surface of the touch unit with a first feedback approach; or vibrating the electronic apparatus with a first preset approach.

In another aspect, an electronic apparatus is provided in an embodiment of the disclosure. The electronic apparatus includes:

a touch unit;

a detection module, configured to detect a first contact area of a portion where the touch unit contacts with a first touch object, if it is sensed that a first touch operation is performed on a surface of the touch unit by the first touch object;

a judgment module, configured to judge whether the first contact area satisfies a first preset condition; and a control module, configured to control the electronic apparatus to switch from a first operating state to a second operating state and generate first prompt information for prompting that the electronic apparatus operates in the second operating state, in the case that the first contact area satisfies the first preset condition.

Optionally, the judgment module is configured to, judge whether the first contact area is larger than a first preset area threshold and determine that the first contact area satisfies the first preset condition if the first area is larger than the first preset area threshold; or the judgment module is configured to, judge whether the first contact area is smaller than a first preset area threshold and determine that the first contact area satisfies the first preset condition if the first area is smaller than the first preset area threshold.

Optionally, the electronic apparatus further includes:

a first determination module, configured to determine a second contact area of a portion where the touch unit contacts with a first user, before judging whether the first area is larger than the first preset area threshold or before judging whether the first area is smaller than the first preset area threshold;

an obtaining module, configured to obtain a second preset area threshold pre-stored in the electronic apparatus; and a second determination module, configured to determine the first preset area threshold corresponding to the first user, based on the second contact area and the second preset area threshold.

Optionally, in the case that the first operating state is a state in which the touch unit responds to the touch operation in a first responding mode, the control module is configured to control a responding mode of the touch unit to switch from the first responding mode to a second responding mode, and determine that the electronic apparatus operates in the second operating state if the responding mode is the second responding mode.

Optionally, the electronic apparatus further includes:

a third determination module, configured to, after controlling the responding mode of the touch unit to switch from the first responding mode to the second responding mode different from the first responding mode, determine an instruction set corresponding to the second responding mode;

a response module, configured to respond to the first touch operation to determine, from the instruction set, a first control instruction corresponding to the first touch operation; and an execution module, configured to execute the first control instruction to implement a first function corresponding to the first control instruction.

Optionally, the control module is configured to control the electronic apparatus to display an interactive object on a surface of a display unit of the electronic apparatus and determine that the electronic apparatus operates in the second operating state in the case that the interactive object is displayed on the surface of the display unit.

Optionally, the first prompt information is revealed by:

displaying a first preset image on the surface of the display unit of the electronic apparatus; or performing touch feedback on the surface of the touch unit with a first feedback approach; or vibrating the electronic apparatus with a first preset approach.

A technical solution provided according to embodiments of the disclosure has at least the following technical effects or advantages.

(1) According to the embodiments of the disclosure, since the first prompt information is generated when the operating state of the electronic device is switched from the first operating state to the second operating state, the touch unit is prevented from responding wrongly.

For example, when the electronic apparatus is in the first operating state, the touch unit responds to the touch operation by responding to the touch coordinates. While when the electronic apparatus is switched from the first operating mode to the second operating state, the touch unit responds to the touch operation by responding to the touch area, and, the electronic apparatus informs, through the first prompt information, the user that the responding mode of the touch unit is switched. Therefore, the user may perform the touch operation based on switch-to the responding mode, and the touch unit is prevented from responding wrongly accordingly.

(2) According to the embodiments of the disclosure, since for different values of the first contact area related to the first touch operation, different instruction sets are used to respond to the first touch operation, and accordingly, different first control instructions are generated. Hence, the control for the electronic apparatus is diversified.

(3) According to the embodiments of the disclosure, since the first preset area threshold may be set varying with the first contact area of the portion where the touch unit contacts with the first user, that is to say, for different users, different first preset area thresholds are set for the touch unit to switch the responding mode. Accordingly, a response to the touch operation is more accurate.

(4) According to the embodiments of the disclosure, since the first prompt information may be revealed with many approaches, for example, by displaying the first preset image on the surface of the display unit of the electronic apparatus, by performing touch feedback with the first feedback approach on the surface of the touch unit, by vibrating the electronic apparatus with the first preset approach, or the like. Accordingly, the approaches for prompting the switch of the responding mode are diversified.

DETAILED DESCRIPTION OF EMBODIMENTS

An information processing method and an electronic apparatus are provided according to embodiments of the disclosure, to solve an exiting problem that a touch unit responds wrongly.

A technical solution according to the embodiments of the disclosure is described as follows.

An information processing method, applied to an electronic apparatus including a touch unit, is provided. The method includes: detecting a first contact area of a portion where the touch unit contacts with the first touch object if it is detected that a first touch operation is performed on a surface of the touch unit by a first touch object; judging whether the first contact area satisfies a first preset condition; and in the case that the first contact area satisfies the first preset condition, controlling the electronic apparatus to switch from a first operating state to a second operating state and generating first prompt information for prompting that the electronic apparatus operates in the second operating state. The process of judging whether the first contact area satisfies the first preset condition may includes: judging whether the first contact area is larger than a first preset area threshold, or judging whether the first contact area is smaller than a first preset area threshold. The first preset area threshold may be a default in the electronic apparatus, or the first preset area threshold may be adjusted for different users. The first prompt information may have many types, for example, the first prompt information may be revealed by displaying a first preset image on a surface of a display unit of the electronic apparatus, or by performing touch feedback on the surface of the touch unit with a first feedback approach, or by vibrating the electronic apparatus with a first preset approach, etc.

In the technical solution, since the first prompt information is generated when the operating state of the electronic apparatus is switched from the first operating state to the second operating state, the touch unit is prevented from responding wrongly.

For getting better understanding, the technical solution is described in detail hereinafter in conjunction with drawings and the embodiments of the disclosure. It should be understood that, the embodiments of the disclosure and specific features in the embodiments are intended to illustrate rather than to limit the technical solution of the disclosure. The embodiments of the disclosure and technical features in the embodiments may be combined if no conflict is caused by the combination.

In one aspect, an information processing method is provided according to an embodiment of the disclosure. The method is applied to an electronic apparatus including a touch unit. The touch unit may be a touchpad, a touch display, etc. The electronic apparatus may be a tablet computer, a laptop, a cell phone, etc.

Figure 1:
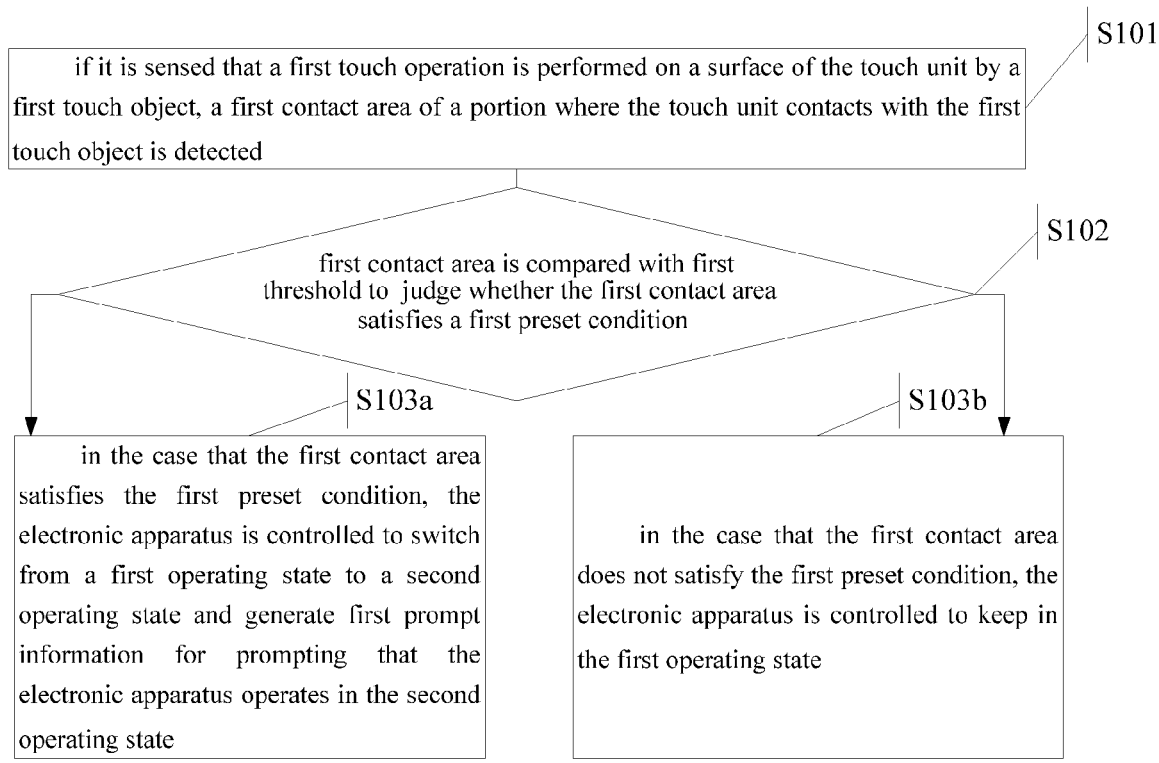
FIG. 1 is a flowchart of an information processing method according to an embodiment of the disclosure.

As shown in FIG. 1, the method includes the following steps S101 to S103b.

In the step S101, if it is detected that a first touch operation is performed on a surface of the touch unit by a first touch object, a first contact area of a portion where the touch unit contacts with the first touch object is detected.

In the step S102, it is judged whether the first contact area satisfies a first preset condition.

In the step S103a, in the case that the first contact area satisfies the first preset condition, the electronic apparatus is controlled to switch from a first operating state to a second operating state, and to generate first prompt information for prompting that the electronic apparatus operates in the second operating state.

In the step S103b, in the case that the first contact area does not satisfy the first preset condition, the electronic apparatus is controlled to keep in the first operating state.

In practice, the first touch operation may be an operation performed in any region of the touch unit, for example, the center or the periphery of the touch unit, or the like. The first touch object may be any touch object, for example, a finger of a user, a stylus, or the like.

According to an embodiment of the disclosure, the touch unit in the step S101 is a capacitive touch unit. The process of detecting the first contact area of the portion where the capacitive touch unit contacts with the first touch object includes: detecting a first region where a capacitance of the capacitive touch unit is changed, and determining the first contact area based on the area of the first region. Alternatively, according to another embodiment of the disclosure, the touch unit in the step S101 is an infrared touch unit. The process of detecting the first contact area of the portion where the touch unit contacts with the first touch object includes: determining a second region where infrared light emitted from an infrared emitter in the infrared touch unit is blocked by the first touch object, and determining the first contact area based on the second region. I, in practice, the first contact area may be determined with other approaches, which are not enumerated or limited in the disclosure.

According to an embodiment of the disclosure, in the step S102, the process of judging whether the first contact area satisfies the first preset condition includes: judging whether the first contact area is larger than a first preset area threshold, and determining that the first contact area satisfies the first preset condition if the first area is larger than the first preset area threshold. For example, the first preset area threshold may be set as 0.5 square centimeter (which may also be set as other values such as 0.2 square centimeter, 0.8 centimeter, etc.). In the case that the first contact area is larger than the first preset area threshold, for example, the first contact area is 0.7 square centimeter, the responding mode of the touch unit is adjusted.

Alternatively, according to another embodiment of the disclosure, the process of judging whether the first contact area satisfies the first preset condition includes: judging whether the first contact area is smaller than a first preset area threshold, and determining that the first contact area satisfies the first preset condition if the first area is smaller than the first preset area threshold. A situation that the first contact area is larger than the first preset area threshold and a situation that the first contact area is smaller than the first preset area threshold respectively correspond to different responding modes. The correspondences are not limited in the disclosure.

Figure 5:
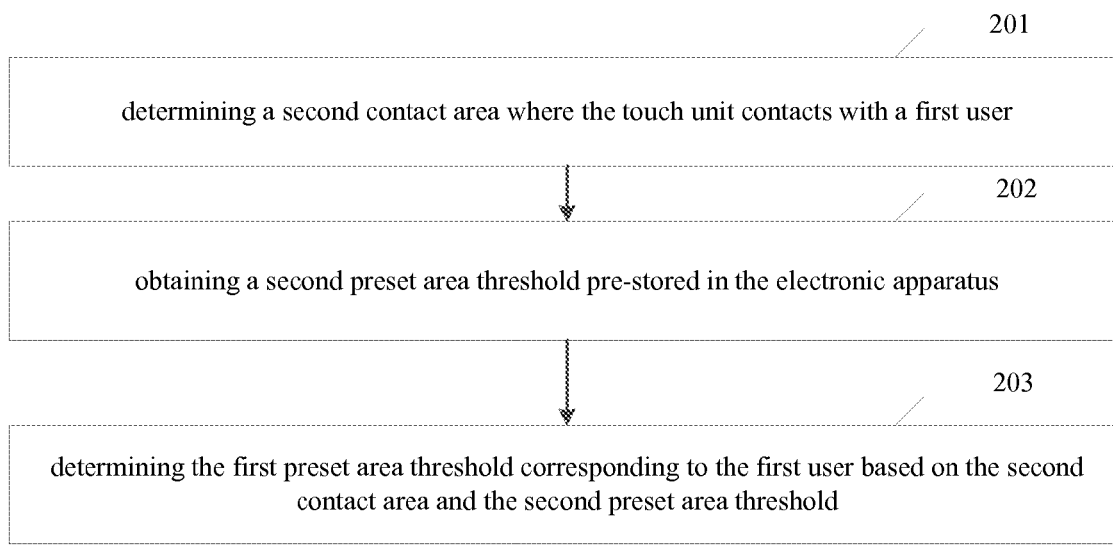
FIG. 5 is a flowchart of an information processing method according to an embodiment of the disclosure.

According to an embodiment of the disclosure, the first preset area threshold is pre-stored in the electronic apparatus. The first preset area threshold is a fixed value such as 0.3 square centimeter, 0.5 square centimeter, etc. Alternatively, according to another embodiment of the disclosure, as shown in FIG. 5, the first preset area threshold may be determined with the following approach: step 201, determining a second contact area where the touch unit contacts with a first user; step 202 obtaining a second preset area threshold pre-stored in the electronic apparatus; and step 203, determining the first preset area threshold corresponding to the first user based on the second contact area and the second preset area threshold. For example, the second preset area threshold, assumed as 0.5 square centimeter, is pre-stored in the electronic apparatus (in deed, the second preset area threshold may be other values, such as 0.3 square centimeter, 0.7 square centimeter). Before the touch operation is performed on the touch unit of the electronic apparatus by the first user, the second contact area where the touch unit contacts with the first user is determined. An effective touch area of a finger of the first user may be further determined based on the second contact area, assumed as 0.3 square centimeter. An effective touch area threshold may be set in the electronic apparatus, assuming as 0.4 square centimeter. If the effective touch area is larger than the effective touch area threshold, the second preset area threshold is increased based on a difference between the effective touch area and the effective touch area threshold, to obtain the first preset area threshold. Alternatively, if the effective touch area is smaller than the effective touch area threshold, the second preset area threshold is decreased based on a difference between the effective touch area and the effective touch area threshold, to obtain the first preset area threshold. For example, assuming that the effective touch area is 0.3 square centimeter and the touch contact area threshold is 0.4 square centimeter, the effective touch area is smaller than the effective touch area threshold. Hence, the second preset area threshold of 0.5 square centimeter may be decreased by, for example, 0.1 square centimeter to obtain the first preset area threshold of 0.4 square centimeter. Obviously, the above data is intended to explain rather than to limit the embodiment of the disclosure.

With the above description, it could be understood that according to the embodiments of the disclosure, the first preset area threshold may be set varying with the first contact area of the portion where the touch unit contacts with the first user, that is to say, for different users, different first preset area thresholds are set for the touch unit to switch the mode for responding to the touch operation. Accordingly, a response to the touch operation is more accurate.

In the step S103a, the process of controlling the electronic apparatus to switch from the first operating state to the second operating state may be discussed in many situations. Two situations are described hereinafter. Apparently, it is not limited to the two situations in practice.

In a first situation, in the case that first operating state is a state in which the touch unit responds to the touch operation with a first responding mode, the process of controlling the electronic apparatus to switch from the first operating state to the second operating state includes:

controlling the touch unit to switch from the first responding mode to a second responding mode different from the first responding mode, and determining that the electronic apparatus operates in the second operating state in the case of the second responding mode.

The first operating state corresponds to the first responding mode of the touch unit. The second operating state corresponds to the second responding mode of the touch unit. The touch unit is controlled to use different responding modes based on different contact areas.

Furthermore, in the step S103a, different responding modes of the electronic apparatus may correspond to different instruction sets. As shown in table 1, the following instruction sets are included in the electronic apparatus.

TABLE 1

| respodning mode | | instruction sets |
|---|---|---|
| first responding mode | operations | control instructions |
| | sliding operation from left to right | an instruction of displaying a former application |
| | sliding operation from right to left | an instruction of displaying all applications |
| | long press | an instruction of changing a wallpaper |
| | clicking icons on the surface | executing applications correspodning to the icons |
| second responding mode | operations | control instructions |
| | sliding operation from left to right | returning |
| | sliding operation from right to | screen rotation |

TABLE 1-continued

| respodning mode | instruction sets |
|---|---|
| left long press | an instruction of displaying a task manager |

Accordingly, after the switching from the first responding mode to the second responding mode, a control instruction corresponding to the operation changes although the operation of the first user using the electronic apparatus does not change.

With the above description, it could be understood that according to the embodiments of the disclosure, for different values of the first contact area related to the first touch operation, different instruction sets are used to respond to the first touch operation, and accordingly, different first control instructions are generated. Hence, the control for the electronic apparatus is diversified.

According to an embodiment, the first prompt information in the step S103a is the prompt information revealed by displaying a first preset image on a surface of a display unit of the electronic apparatus. For example, if the first preset condition is that the first contact area is larger than the first preset area threshold, and the first contact area satisfies the first preset condition, a circle with a gradually decreasing radius is displayed on the display unit when the responding mode is switched to the second responding mode. Alternatively, if the first preset condition is that the first contact area is smaller than the first preset area threshold, and the first contact area satisfies the first preset condition, a circle with a gradually increasing radius is displayed on the display unit when the responding mode is switched to the second responding mode. The circles are merely intended to explain, rather than to limit the first preset image.

According to another embodiment of the disclosure, the first prompt information in the step S103a is the prompt information revealed by performing touch feedback on the surface of the touch unit with a first feedback approach. The first feedback approach may include: generating static electricity with a preset intensity on the surface of the touch unit, generating a preset number of bumps on the surface of the touch unit, vibrating with a preset number of motors provided at the bottom of the touch unit, or the like.

According to further another embodiment of the disclosure, the first prompt information in the step S103a is the prompt information revealed by vibrating the electronic apparatus with a first preset approach. That is, multiple motors are arranged in the electronic apparatus, and it may be prompted, through vibration of the motors in different regions, that the responding mode is switched. For example, the vibration may exist in an upper portion of the electronic apparatus, in the middle of the electronic apparatus, or the like.

With the above description, it should be understood that according to the embodiments of the disclosure, the first prompt information may be revealed with many approaches, for example, by displaying the first preset image on the surface of the display unit of the electronic apparatus, by performing touch feedback with the first feedback approach on the surface of the touch unit, by vibrating the electronic apparatus with the first preset approach, or the like. Accordingly, the approaches for prompting the switch of the responding mode are diversified.

According to an embodiment of the disclosure, after the operating mode is switched to the second responding mode in the step S103a, the method may further include: determining an instruction set corresponding to the second responding mode; determine, from the instruction set, a first control instruction corresponding to the first touch operation in response to the first touch operation; and executing the first control instruction to implement a first function corresponding to the first control instruction. For example, assuming that the first touch operation is the long press, the control instruction corresponding to the long press is determined, based on an instruction set corresponding to the second responding mode shown in table 1, as an instruction of displaying a task manager. The electronic apparatus executes the instruction of displaying the task manager to invoke the task manager of the electronic apparatus, and accordingly, applications currently run in the electronic apparatus are managed.

In a second situation, the process of controlling the electronic apparatus to switch form the first operating mode to the second operating mode includes: controlling the electronic apparatus to display an interactive object on a surface of a display unit of the electronic apparatus, where it is indicated that the electronic apparatus operates in the second operating state in the case that the interactive object is displayed on the surface of the display unit.

Figure 2:
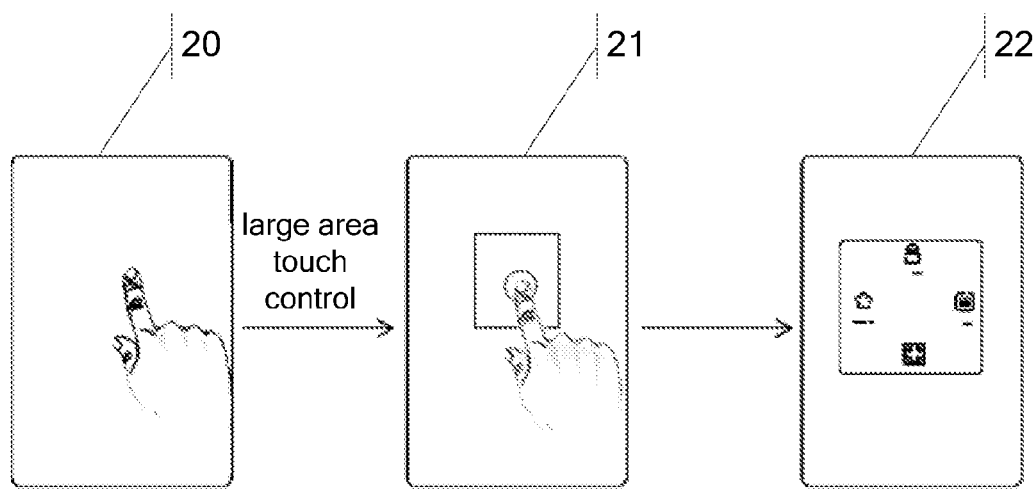
FIG. 2 is a diagram showing that an interactive object is displayed on a display unit of an electronic apparatus in an information processing method according to an embodiment of the disclosure.

As shown in FIG. 2, the first touch object is a finger of a user. A touch display of the electronic apparatus is provided as the touch unit and the display unit. "20" illustrates that a finger of a user does not contact with the touch display. "21" illustrates that the finger of the user contacts with the touch display. "22" illustrates that the interactive object is displayed on the surface of the touch display. After the finger of the user departs from the touch display, the interactive object continues being displayed. While if the finger of the user clicks in a blank area of the touch display, the interactive object disappears.

Figure 3:
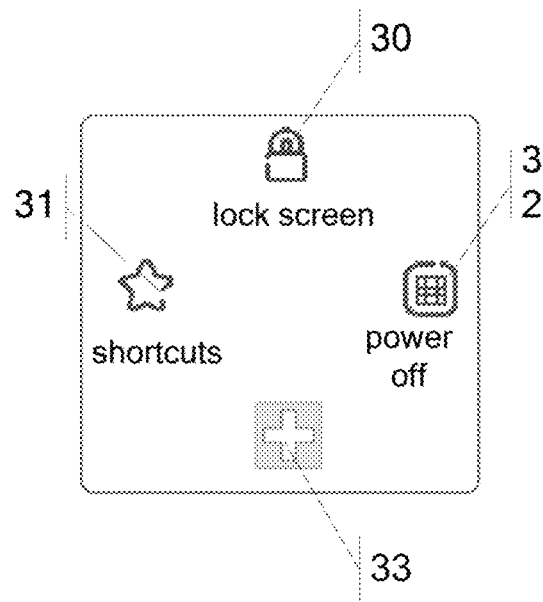
FIG. 3 is a diagram showing an interactive interface in an information processing method according to an embodiment of the disclosure.

The interactive object may be any interactive object. FIG. 3 is a schematic diagram of an interactive object. There are four icons displayed on the interactive object. Icon 30 is a shortcut for lock screen, the user may control the electronic apparatus to get in a lock screen state by clicking the icon 30. Icon 32 is a shortcut for power off, the user may control the electronic apparatus to get powered off by clicking the icon 32. Icon 31 relates to shortcuts, by clicking which the shortcuts for multiple functions may be displayed. New shortcuts may be set at icon 33 by clicking icon 33.

In the step S103b, the process of controlling the electronic apparatus to keep in the first operating state may be discussed in many situations. Two situations are described hereinafter. In deed, it is not limited to the two situations in practice.

In a first situation, the process of controlling the electronic apparatus to keep in the first operating state includes: controlling the responding mode of the touch unit to be the first responding mode, that is, responding to the touch operation with the instruction set corresponding to the first responding mode in the case that the touch operation is performed on the surface of the touch unit.

In a second situation, the process of controlling the electronic apparatus to keep in the first operating state includes: controlling the electronic apparatus not to display the interactive object on the display unit of the electronic apparatus.

The information processing method applied to the electronic apparatus is described hereinafter in conjunction with several embodiments of the disclosure. According to the embodiments, several possible application scenarios are mainly described. It should be noted that, the embodiments of the disclosure are intended to explain rather than to limit the disclosure. Any other embodiment consistent with the mind of the disclosure should fall in the scope of protection of the disclosure, and it is obvious for those skilled in the art to make variations based on the mind of the disclosure.

A First Embodiment

According to the embodiment, it is explained with an example that the electronic apparatus is a cell phone. The cell phone includes a touch display unit. The cell phone includes the first responding mode and the second responding mode shown in table 1.

At a moment T1, user A uses the cell phone to browse web pages. The user A performs a first sliding operation from right to left on the surface of the touch display unit. After the sliding operation is sensed by the cell phone, a first contact area of a portion where the touch display unit contacts with the user A during the first sliding operation is detected. The first contact area is assumed as 0.4 square centimeter. It is judged whether the first contact area is larger than a first presser area threshold. The first presser area threshold is assumed as 0.5 square centimeter. It is determined that the first contact area does not satisfy a first preset condition, and accordingly, the cell phone is controlled to respond to the first sliding operation in the first responding mode. The cell phone determines, from an instruction set corresponding to the first responding mode shown in table 1, a control instruction corresponding to the first sliding operation as an instruction of displaying all applications. Then, the cell phone executes the control instruction and displays an application manager in the cell phone.

At a moment T2, the user A performs chatting online with user B. The user A performs a long press on a surface of the touch display unit of the cell phone during the chat. After the long press is sensed by the cell phone, a first contact area of a portion where the touch display unit contacts with the finger of the user A during the long press is detected. The first contact area is assumed as 0.6 square centimeter. Since the first contact area of 0.6 square centimeter is larger than the first presser area threshold of 0.5 square centimeter, it is determined that the first contact area satisfies the first preset condition, and the responding mode of the touch display unit is switched from the first responding mode to the second responding mode. And, in a preset region of the surface of the touch display unit, where the touch display unit contacts with the finger of user A, a circle with a gradually increasing radius is displayed to prompt the switch. The cell phone determines, from an instruction set corresponding to the second responding mode, an instruction corresponding to the long press as an instruction of displaying a task manager. Then the cell phone executes the instruction of displaying the task manager and displays applications run in the cell phone.

A Second Embodiment

According to the embodiment, it is explained with an example that the electronic apparatus is a laptop. The laptop includes a touchpad. The laptop includes the first responding mode and the second responding mode shown in table 1.

At a moment T3, user C uses the laptop to perform document editing. The user C performs a second sliding operation from left to right on a surface of the touchpad during the document editing. If it is sensed that the touch pad contacts with the user C, a first contact area of a portion where the touchpad contacts with the user C is detected. The first contact area is assumed as 0.4 square centimeter. It is judged whether the first contact area is smaller than a first presser area threshold. The first presser area threshold is assumed as 0.5 square centimeter. Since the first contact area of 0.4 square centimeter is smaller than the first presser area threshold of 0.5 square centimeter, it is determined that the first contact satisfies a first preset condition, and accordingly, a responding mode of the touchpad is switched to the second responding mode. And, four pumps are generated at a location where the surface of the touchpad contacts with the finger of the user C, to prompt the switch.

Figure 4:
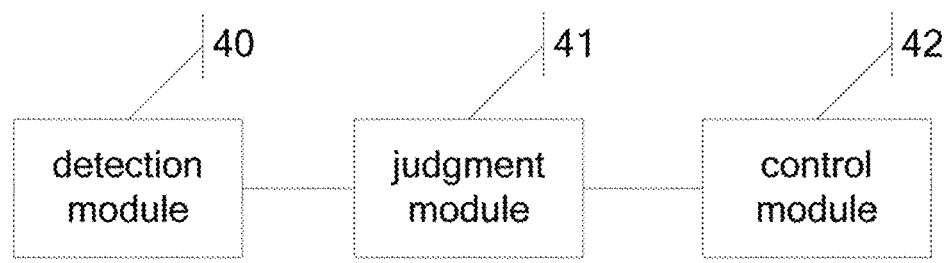
FIG. 4 is a structure diagram of an electronic apparatus according to an embodiment of the disclosure.

In another aspect, based on the same inventive conception, an electronic apparatus is provided according to an embodiment of the disclosure. The electronic apparatus includes a touch unit. As shown in FIG. 4, the electronic apparatus further includes a detection module 40, a judgment module 41, and a control module 42.

The detection module 40 is configured to, detect a first contact area of a portion where the touch unit contacts with the first touch object if it is sensed that a first touch operation is performed on a surface of the touch unit by a first touch object detect.

The judgment module 41 is configured to judge whether the first contact area satisfies a first preset condition.

The control module 42 is configured to control the electronic apparatus to switch from a first operating state to a second operating state, and generate first prompt information for prompting that the electronic apparatus is in the second operating state, in the case that the first contact area satisfies the first preset condition.

Optionally, the judgment module 41 is configured to, judge whether the first contact area is larger than a first preset area threshold, and determine that the first contact area satisfies the first preset condition if the first contact area is larger than the first preset area threshold; or the judgment module is configured to, judge whether the first contact area is smaller than the first preset area threshold, and determine that the first contact area satisfies the first preset condition if the first contact area is smaller than the first preset area threshold.

Optionally, the electronic apparatus further includes:

a first determination module, configured to determine a second contact area of a portion where the touch unit contacts with a first user, before judging whether the first contact area is larger than the first preset area threshold or before judging whether the first contact area is smaller than the first preset area threshold;

an obtaining module, configured to obtain a second preset area threshold pre-stored in the electronic apparatus; and a second determination module, configured to determine the first preset area threshold corresponding to the first user, based on the second contact area and the second preset area threshold.

Optionally, in the case that the first operating state is a state in which the touch unit responds to the touch operation in a first responding mode, the control module is configured to control a responding mode of the touch unit to switch from the first responding mode to a second responding mode, and determine that the electronic apparatus operates in the second operating state in the case that the responding mode is the second responding mode.

Optionally, the electronic apparatus further includes:

a third determination module, configured to determine an instruction set corresponding to the second responding mode, after controlling the responding mode of the touch unit to switch from the first responding mode to the second responding mode different from the first responding mode;

a response module, configured to determine, from the instruction set, a first control instruction corresponding to the first touch operation from the instruction set, in response to the first touch operation; and an execution module, configured to execute the first control instruction to implement a first function corresponding to the first control instruction.

Optionally, the control module 42 is configured to control the electronic apparatus to display an interactive object on a surface of a display unit of the electronic apparatus, determine that the electronic apparatus is in the second operating state in the case that the interactive object is displayed on the surface of the display unit.

Optionally, the First Prompt Information is Revealed by:

displaying a first preset image on the surface of the display unit of the electronic apparatus; or performing touch feedback on the surface of the touch unit with a first feedback approach; or vibrating the electronic apparatus with a first preset approach.

The electronic apparatus is used to implement the information processing method. Therefore, operation processes of the electronic apparatus are same as those in the described one or more method embodiments, which are not further described here.

The technical solution according to the embodiments of the disclosure has at least the following technical effects or advantages.

(1) According to the embodiments of the disclosure, since the first prompt information is generated when the operating state of the electronic device is switched from the first operating state to the second operating state, the touch unit is prevented from responding wrongly.

For example, when the electronic apparatus is in the first operating state, the touch unit responds to the touch operation by responding to the touch coordinates. While when the electronic apparatus is switched from the first operating mode to the second operating state, the touch unit responds to the touch operation by responding to the touch area, and the electronic apparatus informs, through the first prompt information, the user that the responding mode of the touch unit is switched. Therefore, the user may perform the touch operation based on the switch-to responding mode, and the touch unit is prevented from responding wrongly accordingly.

(2) According to the embodiments of the disclosure, since for different values of the first contact area related to the first touch operation, different instruction sets are used to respond to the first touch operation, and accordingly, different first control instructions are generated. Hence, the control for the electronic apparatus is diversified.

(3) According to the embodiments of the disclosure, since the first preset area threshold may be set varying with the first contact area of the portion where the touch unit contacts with the first user, that is to say, for different users, different first preset area thresholds are set for the touch unit to switch the responding mode. Accordingly, a response to the touch operation is more accurate.

(4) According to the embodiments of the disclosure, since the first prompt information may be revealed with many approaches, for example, by displaying the first preset image on the surface of the display unit of the electronic apparatus, by performing touch feedback with the first feedback approach on the surface of the touch unit, by vibrating the electronic apparatus with the first preset approach, or the like. Accordingly, the approaches for prompting the switch of the responding mode are diversified.

Although preferred embodiments of the disclosure are described, alterations and variations may be made to those embodiments by those skilled in the art once the basic conception of the disclosure is acquired. Therefore, claims of the disclosure are intended to protect the preferred embodiments and all the alterations and variations falling in the scope of the disclosure.

Obviously, various alterations and variations may be made by those skilled in the art without departing form the spirit and scope of the disclosure. Hence, the disclosure is intended to include all the alterations and variations falling in the scope of the disclosure or equivalent technologies.

The invention claimed is:

1. An information processing method, applied to an electronic apparatus including a touch unit, comprising:
   if it is sensed that a first touch operation is performed on a surface of the touch unit by a first touch object, detecting a first size of a portion of the touch unit where the touch unit contacts with the first touch object;
   comparing the first size with a first preset threshold to judge whether the first size satisfies a first preset condition, comprising determining that the first size satisfies the first preset condition in response to the first size being larger or smaller than the first preset threshold; and
   controlling the electronic apparatus to switch from a first operating state to a second operating state and generate first prompt information for prompting that the electronic apparatus operates in the second operating state, in the case that the first size satisfies the first preset condition,
   wherein before comparing the first size with the first preset threshold to judge whether the first size satisfies the first preset condition, the method further comprises:
   determining a second size of a portion of the touch unit where the touch unit contacts with a first user;
   obtaining a second preset threshold pre-stored in the electronic apparatus; and
   determining the first preset threshold corresponding to the first user, based on the second size and the second preset threshold.

2. The method according to claim 1, wherein in the case that the first operating state is a state in which the touch unit responds to the touch operation in a first responding mode, the process of controlling the electronic apparatus to switch from the first operating state to the second operating state comprises:
   controlling a responding mode of the touch unit to switch from the first responding mode to a second responding mode different from the first responding mode, and determining that the electronic apparatus operates in the second operating state if the responding mode is the second responding mode.

3. The method according to claim 2, wherein after controlling the responding mode of the touch unit to switch from the first responding mode to the second responding mode different from the first responding mode, the method further comprises:
   determining an instruction set corresponding to the second responding mode;
   determining, from the instruction set, a first control instruction corresponding to the first touch operation, in response to the first touch operation; and
   executing the first control instruction to implement a first function corresponding to the first control instruction.

4. The method according to claim 1, wherein the process of controlling the electronic apparatus to switch from the first operating state to the second operating state comprises:
   controlling the electronic apparatus to display an interactive object on a surface of a display unit of the electronic apparatus, and determining that the electronic apparatus operates in the second operating state if the interactive object is displayed on the surface of the display unit.

5. The method according to claim 1, wherein the first prompt information is revealed by:
   displaying a first preset image on a surface of a display unit of the electronic apparatus; or
   performing a touch feedback on the surface of the touch unit with a first feedback approach; or
   vibrating the electronic apparatus with a first preset approach.

6. An electronic apparatus comprising:
   a touch unit;
   a detection module, configured to detect a first size of a portion of the touch unit where the touch unit contacts with a first touch object, if it is sensed that a first touch operation is performed on a surface of the touch unit by the first touch object;
   a judgment module, configured to compare the first size with a first preset threshold to judge whether the first size satisfies a first preset condition, and to determine that the first size satisfies the first preset condition in response to the first size being larger or smaller than the first preset threshold; and
   a control module, configured to control the electronic apparatus to switch from a first operating state to a second operating state and generate first prompt information for prompting that the electronic apparatus operates in the second operating state, in the case that the first size satisfies the first preset condition,
   wherein the electronic apparatus further comprises:
   a first determination module, configured to determine a second size of a portion of the touch unit where the touch unit contacts with a first user, before comparing the first size with the first preset threshold to judge whether the first size satisfies the first preset condition;
   an obtaining module, configured to obtain a second preset threshold pre-stored in the electronic apparatus; and
   a second determination module, configured to determine the first preset threshold corresponding to the first user, based on the second size and the second preset threshold.

7. The electronic apparatus according to claim 6, wherein in the case that the first operating state is a state in which the touch unit responds to the touch operation in a first responding mode, the control module is configured to control a responding mode of the touch unit to switch from the first responding mode to a second responding mode, and determine that the electronic apparatus operates in the second operating state if the responding mode is the second responding mode.

8. The electronic apparatus according to claim 7, further comprising:
   a third determination module, configured to determine an instruction set corresponding to the second responding mode, after controlling the responding mode of the touch unit to switch from the first responding mode to the second responding mode different from the first responding mode;
   a response module, configured to determine, from the instruction set, a first control instruction corresponding to the first touch operation in response to the first touch operation; and
   an execution module, configured to execute the first control instruction to implement a first function corresponding to the first control instruction.

9. The electronic apparatus according to claim 6, wherein the control module is configured to control the electronic apparatus to display an interactive object on a surface of a display unit of the electronic apparatus and determine that the electronic apparatus operates in the second operating state in the case that the interactive object is displayed on the surface of the display unit.

10. The electronic apparatus according to claim 6, wherein the first prompt information is revealed by:
- displaying a first preset image on a surface of a display unit of the electronic apparatus; or
- performing a touch feedback on the surface of the touch unit with a first feedback approach; or
- vibrating the electronic apparatus with a first preset approach.

* * * * *